United States Patent [19]
Zimmer

[11] Patent Number: 5,109,656
[45] Date of Patent: May 5, 1992

[54] ROTARY CUTTING MECHANISM

[76] Inventor: Richard T. Zimmer, 16350 Haggerty, Belleville, Mich. 48111

[21] Appl. No.: 654,289

[22] Filed: Feb. 11, 1991

[51] Int. Cl.⁵ ............................................ A01D 55/18
[52] U.S. Cl. ...................................... 56/17.5; 56/295
[58] Field of Search ................ 56/17.5, 249, 255, 289, 56/293-295

[56] References Cited

U.S. PATENT DOCUMENTS

| | | | |
|---|---|---|---|
| 2,576,884 | 11/1951 | Leigh | 56/17.5 X |
| 2,877,619 | 3/1959 | Benson et al. | 56/295 |
| 2,916,867 | 12/1959 | Chadwick | 56/295 |
| 2,957,295 | 10/1960 | Brown | 56/17.5 X |
| 3,343,350 | 9/1967 | Freelander et al. | 56/295 |
| 3,531,923 | 10/1970 | De Lay | 56/17.5 X |
| 3,621,642 | 11/1971 | Leake, Jr. | 56/295 |
| 3,918,241 | 11/1975 | Stillions | 56/12.7 |
| 4,257,214 | 3/1981 | Ferguson et al. | 56/13.4 |
| 4,292,791 | 10/1981 | Lalonde | 56/255 |

*Primary Examiner*—Thuy M. Bui
*Attorney, Agent, or Firm*—Donald P. Gillette

[57] ABSTRACT

A rotary cutting mechanism having crossed blades mounted one above the other on a common shaft. Each of the blades has a cutting edge located at each outer end and facing in the direction of rotation. The outer ends of the upper blade are displaced downwardly so that its cutting edges lie in substantially the same plane as the cutting edges of the lower blade.

15 Claims, 1 Drawing Sheet

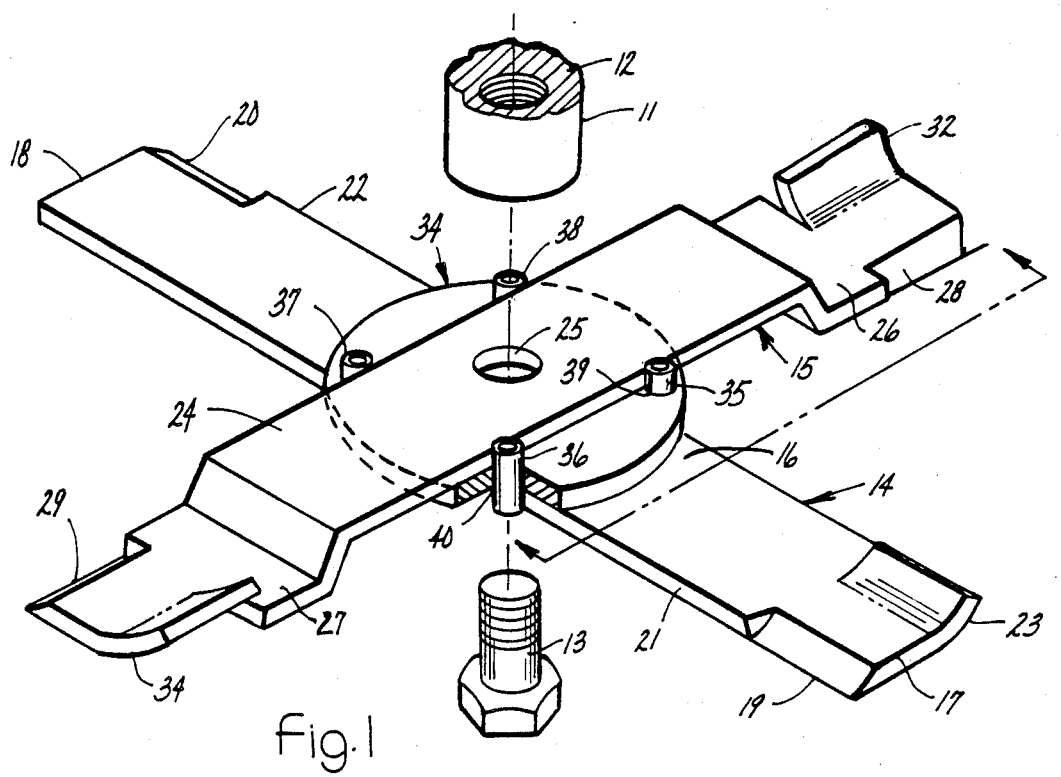
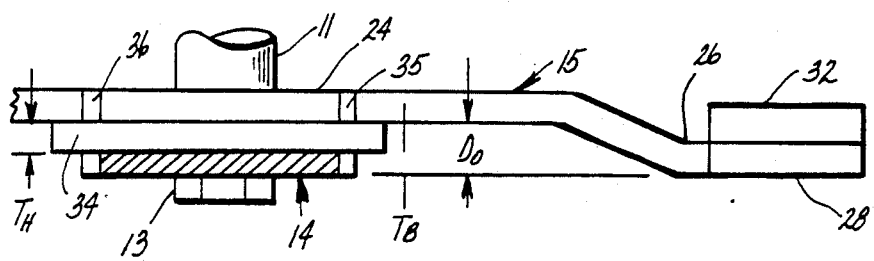
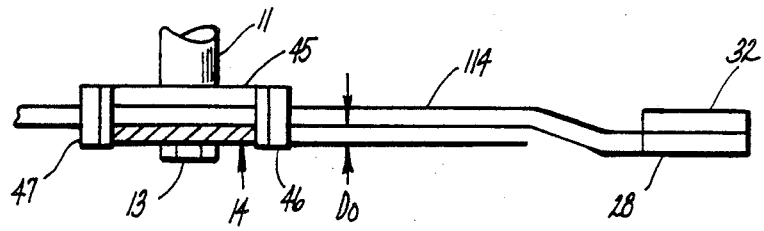
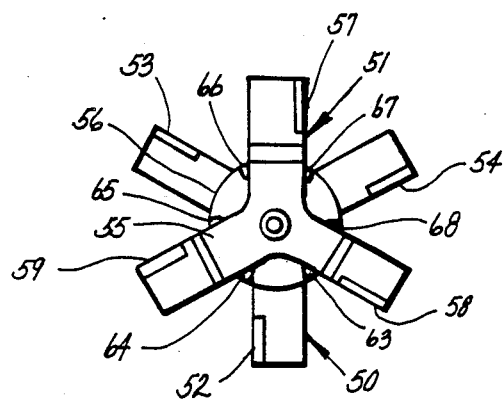

ROTARY CUTTING MECHANISM

BACKGROUND OF THE INVENTION

1. Field of the Invention

This invention relates to an improved blade arrangement for mounting two blades of a rotary mowing machine on a common shaft with the cutting edges of both blades in substantially the same plane. In particular, it relates to an improved arrangement for mounting two blades on a common drive shaft in such a way that the cutting edges of both blades are not only in the same plane, but those of one blade are angularly located midway between those of the other.

2. The Prior Art

The concept of mounting two rotary mowing blades on a common shaft and at a right angle to each other has been suggested before in some of the following U.S. patents: U.S. Pat. Nos. 2,877,619 Benson et al., 2,926,867 Chadwick, 3,382,653 De Buigne, 3,343,350 Freedlander et al., 3,918,241 Stillions, 4,257,214 Ferguson et al., and 4,292,791 Lalonde. However, none of the prior art has suggested a mounting arrangement that places the cutting edges of both blades in a common plane. Doing so results in a neater cut, speeds up the mowing operation by allowing the machine to be moved forward at a greater speed while still making a neat cut. It also increases the vacuum ability of the mowing structure, thus blowing the cut vegetation to the outlet of the mowing machine with greater force and dispersing the grass farther, if the cut grass is not being captured in a container but is being allowed to fall to the ground. In addition, doubling the number of blades and keeping the cutting edges in the same plane so that both blades share equally in the work increases the time the blades can be used before they have to be sharpened again. While it then becomes necessary to sharpen twice as many blades, doubling the number of blades on a drive shaft does not substantially increase the time required for removing them from the shaft to sharpen them and then putting them back on again. Thus, the total increase in work output and in the quality of the result is of greater benefit than the time lost in the complete sharpening procedure.

OBJECTS AND SUMMARY OF THE INVENTION

A principal object of this invention is to provide an improved rotary cutting mechanism capable of cutting grass and other vegetation more smoothly and quickly than current cutting mechanisms using blades of the same length and operating at the same rotational speed.

Another object is to provide a simple mechanism that facilitates stacking rotary mower blades so that all of their cutting edges will be in the same plane.

Other objects will become apparent to those skilled in the art of rotary cutting mechanisms after they have read the following description.

In accordance with the invention, the rotary cutting mechanism includes first and second blades, each rotationally symmetrical about an axis. Each blade has a central mounting portion with arms extending outwardly from it and a flat cutting edge adjacent the outer end of each arm. The cutting edges of each blade are leading edges in that they face in the direction of rotation of the blade about the axis. In addition, the cutting edges on a given blade are formed in a common plane perpendicular to the axis. In the case of a flat blade, the common plane of the cutting edges is typically coplanar with the lower surface of the whole blade, while in the case of a blade having an axial offset between the central portion and the cutting edges, the cutting edges are typically coplanar with the lower surface of the end portions on which those cutting edges are formed but are below the plane of the bottom surface of the central part of that blade.

The blades are mounted on a common drive shaft with the flat blade below the one with the offset, and the mechanism includes holding means that engage the central portions of both blades to hold them in fixed, axial locations so that the cutting edges on the blade with the offset are in substantially the same plane as the cutting edges of the flat, bottom blade. This is accomplished by forming the holding means so that its axial thickness $T_H$ between the central portions of the upper and lower blades is:

$$T_H = D_O - T_B$$

wher $D_O$ is the offset distance in the axial direction from the lower surface of the upper blade to the common plane of the cutting edges of that blade, and $T_B$ is the thickness of central part of the bottom blade.

The holding means, which may be a plate or hub having the required thickness, also includes angular guides, or stops, or orienting means, to hold the blades in a desired angular relationship. This also minimizes the amount of time required to reassemble the blades on the driving mechanism after the blades have been sharpened. The guides can be dowel pins or roll pins extending from its opposite surfaces and spaced to engage opposite edges of the central portions of the two blades, although other guides can be used. In the case of pins, preferably there are four of them arranged at the corners of a rectangular area and spaced so that each pin engages one edge, each, of the two blades.

BRIEF DESCRIPTION OF THE DRAWINGS

FIG. 1 is a cut-away perspective view of a mowing machine blade arrangement in accordance with this invention.

FIG. 2 is a cross-sectional view along the line 2—2 in FIG. 1 of part of a stacking arrangement for the blades in FIG. 1.

FIG. 3 is a cross-sectional view of modified blades similar, but not identical, to the blades in FIGS. 1 and 2.

FIG. 4 is a top view of an arrangement of modified blades, each having three cutting edges.

DESCRIPTION OF A PREFERRED EMBODIMENT

FIG. 1 shows only a small part of a blade shaft 11 of a rotary mowing machine. The shaft is part of the blade-driving means of a machine that, except for the blade arrangement, may be a typical rotary mower, especially a commercial mowing machine. The shaft has a central, threaded bore 12 to receive a bolt 13 that holds two blades 14 and 15 on the shaft 11. The blades are often referred to as bars, and they are rotationally symmetrical about the axis of the shaft 11. In this embodiment, the blade 14 is similar to a standard blade with a flat central mounting portion 16 that has a central aperture (not shown) through which the bolt 13 extends. The head of the bolt, when tightened, engages the bottom surface of the central portion 16, which is in a plane perpendicular to the axis of rotation of the shaft 11. At the blade ends 17 and 18 are sharpened portions 19 and 20 that form cutting edges, each of which extends along opposite edges 21 and 22, respectively, of the blade. The cutting edges are on the leading edges in the direction of rotation of the blade.

It is standard practice to sharpen only the outer few inches of a rotary mower blade and to do so by grinding away blade material so that the cutting edges 19 and 20 are not only coplanar with each other but the plane in which they lie is also coplanar with the bottom surface of the blade. It should be noted that some blades are sharpened most of all of the way to the center, rather than just adjacent the ends.

While the blade 14 is much like a standard blade, its two ends are actually representative of two standard types of blades. The end 17 is illustrated as having an upwardly bent portion 23 along the part of the trailing edge near that end. This is a standard feature on many, if not most, mower blades, and its purpose is to blow air upward, thereby creating suction that lifts vegetation about to be cut and dispenses vegetation that has just been cut. However, not all blades have such a feature; the other end 18 represents another standard type of mower blade that is entirely flat.

The blade 15 is also a standard type of blade, frequently referred to as a "high lift" blade. In this embodiment, it has a flat central portion 24 which has a center hole 25 just large enough to accommodate the bolt 13 and is axially offset from end portions 26 and 27 that are also flat. This blade has two cutting edges 28 and 29 along the outermost parts of edges 30 and 31, respectively, and it has two bent, lift portions 32 and 33 along trailing edge regions opposite the cutting edges 28 and 29, respectively.

In accordance with this invention, a holding member, or hub, 34, which is in the form of a flat, circular plate in this embodiment, is sandwiched between the central parts 16 and 24. The hub also has a center hole just large enough to accommodate the bolt 13, and it has four guides 35-38, each of which is secured within a respective aperture. Only the apertures 39 and 40 for the guides 35 and 36 are designated in the drawing. As a further feature of this invention, all of the guides are located so that each one engages one edge of the central portion 16 and one edge of the central portion 24, and all of the guides are positioned to keep the blades 14 and 15 perpendicular to each other. This means that the guides are located at the corners of a rectangle. The hub could also have a corresponding rectangular shape. If both blades are the same width, as is usually the case, the rectangle is actually a square. In FIG. 1, the open distance between the guides 35 and 36 is equal to the width of the blade 14 and is the same as the distance between the guides 37 and 38. Correspondingly, the open distance between the guides 36 and 37 is the same as the open distance between the guides 35 and 38 and is the same as the width of the blade 15. The blades 14 and 15 are illustrated as having the same width, which is consistent with the fact that both flat blades and high-lift blades used on commercial mowers have the same width, and so the distance between the guides 35 and 36 is not only the same as the distance between the guides 37 and 38 but is also the same as the distance between the guides 35 and 38 and the distance between the guides 36 and 37.

The guides 35 and 36 are illustrated as roll pins, the guide 37 is a hardened Allen screw, and the guide 38 is a hardened dowel pin. Different forms of guides are depicted simply to illustrate that the invention is not limited to any one kind of guide. A dowel pin requires very precise machining of the hole in the hub into which it is to fit, and a screw 37 requires that the hole into which it is inserted be threaded. Roll pins do not require threaded holes nor do they require as precise machining as do solid steel dowel pins. Thus, roll pins are preferred, but special requirements may make it necessary to use some other form of guides.

During rotation of the blades in the clockwise direction to cut vegetation, the frictional force that results from the cutting operation acts on both blades in the counter-clockwise direction, forcing the blade 14 against the guides 35 and 37 and the blade 15 against the guides 36 and 38. As a result, it would be possible to have the quides 35 and 37 extend only downward from the hub 34 and the guides 36 and 38 extend only upward. The clamping action between the bolt 13 and the shaft 11 holds the blades against easy slippage.

In accordance with this invention, the cutting edges 28 and 29 of the top blade 15 are to be in the same plane perpendicular to the axis of rotation as the cutting edges 19 and 20 of the bottom blade 14. FIG. 2 shows how this is achieved. It will be recalled from FIG. 1 that the cutting edges 19 and 20 of the blade 14 are normally in the plane of the bottom surfaces of that blade. The cutting edges 28 and 29 of the blade 15 are normally in the same plane as the bottom surfaces of the end portions 26 and 27 on which they are located. While these normal arrangements may not always be true, they will be assumed to be true here. The offset distance in the axial direction of the end portion 26 (end portion 27 is not shown in this figure, but is identical with the end portion 26) for the central portion 24, as measured from the bottom surface 41 of the planar central portion 24 to the plane of the bottom surface 42 of the end portions 26 and 27, is indicated as $D_O$. By making the hub 34 of such a thickness $T_H$ that this thickness plus the thickness $T_B$ of the bottom blade 14 (or, more specifically, of the central portion of the bottom blade) is equal to $D_O$, the cutting edges 28 and 29 will be coplanar with the cutting edges 19 and 20.

Standard, commercial blades 14 and 15 shown in FIGS. 1 and 2 are typically of equal thickness and do not need to be modified to be used in the arrangement illustrated. Moreover, it is standard practice in making offset blades, such as the blade 15, to provide an offset $D_O$ that is about twice as great as the thickness of that blade. Hence, in order to displace such blades the proper distance apart in the axial direction, the spacer hub 34 should have a thickness approximately equal to the thickness of one of the blades. It is convenient to incorporate the guides 35-38 as part of the spacer, but it is possible to use other forms of guides and to use the spacer just as a spacer.

It is also possible to make blades with an axial offset that is equal to the thickness of the associated blade used as the lower blade. FIG. 3 shows such an arrangement in which most of the components and parts of components are the same as in FIGS. 1 and 2 and have same reference numerals. In this embodiment, the offset distance, $D_O$, of the top blade 44 is equal to the thickness $T_B$ of the lower blade 14, which is the minimum amount of offset that allows the cutting edge 28 to be coplanar with the bottom surface 43 of the lower blade 14. A different style of hub 45 is used. Instead of pins, this bub has intergrally-formed projections 46-49, of which only two projections 46 and 47 are visible. These projections are bent down from corners of a square hub 45 in the same relative positions as the guides 35-38 in FIGS. 1 and 2 so that the projections, or guides, 46-49 closely embrace both blades 14 and 44. The main body of the hub 45 is pressed against only one of the blades, in this case, the top blade 44, and the sandwich formed of the blades 14 and 44 and the hub 45 is compressed and solidly held by the bolt 13 and the shaft 11.

In all of the embodiments, the lengths of both the top and bottom blades are substantially equal, as is consistent with the desire to have the cutting operation shared equally by the two blades. For much the same reason, it is desirable for the top and bottom blades to be perpendicular to each other so that both cutting edges of each blade will have equal chances of engaging uncut vegetation, and will thus experience equal wear.

FIG. 4 is a view looking down on a pair of rotationally symmetrical blades 50 and 51, each having three arms, stacked together in the same manner as the two-armed blades 14 and 15 in FIGS. 1 and 2 or blades 14 and 44 in FIG. 3. The blade 50 is on the bottom and is a flat blade with three cutting edges 52-54 coplanar with its bottom surface, similar to the arrangement of the blade 14 in FIG. 1. The top blade 51 has an axially offset central portion 55 and is axially spaced from the bottom blade by a hub 56. As in FIG. 2, the thickness $T_H$ of the hub 56 is equal to the vertical offset $D_O$ minus the thickness $T_B$ of the bottom blade 50 to locate the three cutting edges 57-59 in the same plane as that of the three cutting edges 52-54. Since the three arms of each of the blades are 120° apart, the blades 50 and 51 should be angularly displaced 120° from each other to place each arm of the blade 51 midway between a pair of arms of the blade 50.

The hub 56 is shown with six guides 63-68 spaced apart by equal angles and at radial distances from the axis of rotation so that each guide engages one edge of one arm of the bottom blade 50 and one edge of one arm of the top blade 51. In fact, only two guides 63 and 64 are needed to hold the blades, since it is sufficient to engage two edges of each blade, one preventing clockwise rotation and the other preventing counterclockwise rotation, and those edges need not be on the same arm.

While this invention has been described in terms of specific embodiments, it will be understood by those skilled in the art that modifications can be made therein without departing from the true scope of the invention.

What is claimed is:

1. A rotary cutting mechanism comprising:
    (a) rotary driving means having an axis of rotation;
    (b) a first elongated blade attached to the rotary driving means to rotate with the driving means, the blade being rotationally symmetrical about the axis of rotation and having:
        (i) a central mounting portion with upper and lower surfaces through which the axis passes,
        (ii) first and second arms extending in opposite directions from the central portion, and
        (iii) first and second cutting edges adjacent end portions of the first and second arms, respectively, and facing generally in the direction of rotation of the blade about the axis and lying in a first cutting edge plane perpendicular to the axis of rotation and axially displaced by a predetermined distance from the upper surface of the central portion;
    (c) a second elongated blade attached to the rotary driving means to rotate with the first blade, the second blade also being rotationally symmetrical about the axis and having:
        (i) a second central mounting portion through which the axis passes, the second central portion comprising a lower surface defining a second plane perpendicular to the axis,
        (ii) third and fourth arms extending in opposite directions from the second central portion, each of the third and fourth arms having a respective end portion, and
        (iii) third and fourth cutting edges along the end portions of the third and fourth arms, respectively, and facing generally in the direction of rotation of the second blade about the axis, the third and fourth cutting edges being in a second cutting edge plane perpendicular to the axis and at an axial offset distance from the second plane; and
    (d) holding means engaging the central portions of both blades to hold the blades so that the first and second cutting edge planes are substantially coplanar and the third and fourth cutting edges are angularly spaced substantially midway between the first and second cutting edges.

2. The rotary cutting mechanism of claim 1 in which the holding means comprises hub means extending generally perpendicular to the axis and guide means extending generally axially from the hub means to engage the blades and hold them in fixed, angular relationship to each other.

3. The rotary cutting mechanism of claim 2 in which the guide means comprises:
    (a) first and second surfaces spaced apart in a first direction generally perpendicular to the axis by a distance substantially equal to the width of the first blade: and
    (b) third and fourth surfaces spaced apart in a second direction perpendicular to the first direction and generally perpendicular to the axis by a distance substantially equal to the width of the second blade.

4. The rotary cutting mechanism of claim 2 in which the guide means comprise a plurality of pins engaging opposite edges of the blades.

5. The rotary cutting mechanism of claim 4 in which the pins are dowel pins.

6. The rotary cutting mechanism of claim 4 in which the pins are roll pins.

7. The rotary cutting mechanism of claim 4 in which the pins are hardened, threaded pins.

8. The rotary cutting mechanism of claim 4 in which:
    (a) there are first, second, third, and fourth pins;
    (b) the first and second pins engage a first edge of the first blade of the first blade and the third and fourth pins engage a second edge of the first blade; and
    (c) the first and third pins engage a first edge of the second blade and the second and fourth pins engage a second edge of the second blade.

9. The rotary cutting mechanism of claim 2 in which the hub means comprises a plate located between central portions of the first and second blades and having a thickness $T_H$ between the central portions of the blades equal to the axial offset distance $D_O$ of the second blade minus the thickness $T_B$ of the central portion of the first blade.

10. A rotary cutting mechanism comprising:

(a) a first blade rotationally symmetrical about an axis of rotation to rotate in a certain direction about the axis and having:
  (i) substantially flat upper and lower surfaces perpendicular to the axis and spaced apart by a predetermined distance along the axis and having a central portion with a predetermined width perpendicular to the axis,
  (ii) ends extending outwardly from the central portion, and
  (iii) cutting edges adjacent the ends and facing in the direction or rotation of the blade and in a first common plane at a predetermined axial distance from the upper surface of the central mounting portion;
(b) a second blade rotationally symmetrical about the axis to rotate in the same direction as the first blade and having:
  (i) a central portion that has a lower surface perpendicular to the axis in a predetermined plane, the central portion of the second blade having a predetermined width perpendicular to the axis,
  (ii) ends extending outwardly from the central portion of the second blade and having lower surfaces in a second common plane axially offset by a predetermined distance below the lower surface of the second blade, and
  (iii) flat cutting edges adjacent the respective ends of the second blade and facing in the direction of rotation of the second blade, whereby the cutting edgeds of the second blade are in a third common plane parallel to the lower surface of the central mounting portion of the second blade and vertically displaced therefrom by a distance at least substantially as great as the combined thicknesses of both blades; and
(c) holding means engaging both blades to hold the first and third common planes substantially coplanar.

11. The invention as defined in claim 10 in which the holding means comprises:
  (a) a central portion rotationally symmetrical about the axis; and
  (b) means engaging at least two edges of the first blade and at least two edges of the second blade to hold each of the cutting edges on the first blade substantially midway between pairs of cutting edges of the second blade.

12. The invention as defined in claim 11 in which:
  (a) each blade has three arms, and each arm of each blade one of the cutting edges of that blade on it;
  (b) the means engaging the two edges of the first blade comprise first and second projections extending from the central portion of the holding means; and
  (c) the means engaging the two edges of the second blade comprise the first projection and a third projection extending from the central portion of the holding means.

13. Holding means for holding upper and lower blades of a rotary mowing machine in predetermined relative axial and angular positions to rotate on a shaft having a vertical axis, the lower blade having a first central portion with arms extending outwardly therefrom and a cutting edge along a leading edge portion of each arm adjacent the outer end thereof in a plane common to all of such cutting edges and perpendicular to the axis, the central portion having means defining an upper surface perpendicular to the axis and spaced a predetermined axial distance $T_B$ above the common plane, the upper blade having a second central portion with a lower surface and arms extending outwardly from the second central portion, each of the latter arms having an end portion with a cutting edge along a leading edge of each end portion, the cutting edge of each of the end portions of the second blade being in a plane perpendicular to the axis and offset downwardly from the lower surface of the second central portion by an axial distance $D_O$, the holding means comprising:
  (a) a hub means located between the first and second central portions to space the upper and lower blades vertically apart by a distance $T_H$, where $T_H = D_O - T_B$, to position the plane of the cutting edges of the second blade in the plane common to the cutting edges of the first blade; and
  (b) guide means extending from the hub means to engage edges of each of the blades to hold each cutting edge of the first blade substantially midway between two cutting edges of the second blade.

14. The holding means of claim 13 in which the guide means comprise:
  (a) first and second members extending downwardly from the hub means to engage opposite edges of the lower blade; and
  (b) third and fourth members extending upwardly from the hub means to engage opposite edges of the upper blade.

15. The holding means of claim 14 in which:
  (a) the first and second members also extend upwardly from the hub means;
  (b) the third and fourth pins also extend downwardly from the hub means;
  (c) the first and fourth members engage the same edge of the lower blade and opposite edges of the upper blade; and
  (d) the second and third members engage the same edge of the lower blade and opposite edges of the upper blade.

* * * * *